United States Patent
Novikov et al.

(10) Patent No.: US 9,298,518 B2
(45) Date of Patent: Mar. 29, 2016

(54) SAFE CONSOLIDATION AND MIGRATION

(71) Applicant: International Business Machines Corporation, Armonk, NY (US)

(72) Inventors: Sergey Novikov, Tel Aviv (IL); Marcel Zalmanovici, Kiriat Motzkin (IL); Aviad Zlotnick, Mitzpeh Netofah (IL)

(73) Assignee: International Business Machine Corporation, Armonk, NY (US)

( * ) Notice: Subject to any disclaimer, the term of this patent is extended or adjusted under 35 U.S.C. 154(b) by 44 days.

(21) Appl. No.: 14/326,484

(22) Filed: Jul. 9, 2014

(65) Prior Publication Data

US 2016/0011913 A1    Jan. 14, 2016

(51) Int. Cl.
 *G06F 9/445* (2006.01)
 *G06F 9/50* (2006.01)
 *G06F 9/48* (2006.01)

(52) U.S. Cl.
 CPC ............ *G06F 9/5088* (2013.01); *G06F 9/4856* (2013.01)

(58) Field of Classification Search
 CPC .............................. G06F 9/5088; G06F 9/4846
 USPC ............................................................. 718/1
 See application file for complete search history.

(56) References Cited

U.S. PATENT DOCUMENTS

| | | | | |
|---|---|---|---|---|
| 5,774,718 A * | 6/1998 | Aoshima et al. | ............... | 718/100 |
| 6,549,931 B1 * | 4/2003 | Amor | ................... | G06F 9/5066 718/104 |
| 8,046,767 B2 | 10/2011 | Rolia et al. | | |
| 8,131,667 B1 * | 3/2012 | Snider | ............... | G06F 17/30091 718/1 |
| 8,918,496 B2 * | 12/2014 | Rolia | .................. | G06F 11/3414 703/2 |
| 2004/0194095 A1 * | 9/2004 | Lumb | .................. | G06F 9/4887 718/100 |
| 2005/0075951 A1 * | 4/2005 | Zieger | ............................. | 705/28 |
| 2007/0180452 A1 * | 8/2007 | Hirayama | ............... | G06F 9/505 718/105 |
| 2008/0022284 A1 * | 1/2008 | Cherkasova | .......... | G06F 9/4881 718/104 |
| 2008/0270595 A1 | 10/2008 | Rolia et al. | | |
| 2008/0271039 A1 * | 10/2008 | Rolia et al. | ..................... | 718/105 |
| 2010/0125849 A1 * | 5/2010 | Oswald et al. | ................ | 718/103 |
| 2010/0153958 A1 * | 6/2010 | Richards | ............... | G06F 9/5083 718/104 |

(Continued)

FOREIGN PATENT DOCUMENTS

WO    2013/019185    2/2013

OTHER PUBLICATIONS

Lo et al. "Comparative Study of Real Workload Traces and Synthetic Workload Models for Parallel Job Scheduling", 1998, Springer-Verlag Berlin Heidelberg, pp. 25-46.*

(Continued)

*Primary Examiner* — Wei Zhen
*Assistant Examiner* — Junchun Wu
(74) *Attorney, Agent, or Firm* — Ziu Glazberg

(57) ABSTRACT

A method, apparatus and computer program product for program migration, the method comprising: receiving a target host and an application to be migrated to a target host; estimating a target load of the application to be migrated; generating a synthetic application which simulates a simulated load, the simulated load being smaller than the target load; loading the synthetic application to the target host; monitoring behavior of the target host, the synthetic application, or a second application executed thereon; subject to the behavior being satisfactory: if the simulated load is smaller than the target load, then repeating said generating, said loading and said monitoring, wherein said loading is repeated with increased load; and otherwise migrating the application to the target.

17 Claims, 3 Drawing Sheets

(56) References Cited

U.S. PATENT DOCUMENTS

| | | | |
|---|---|---|---|
| 2010/0262974 A1* | 10/2010 | Uyeda | G06F 9/4856 718/105 |
| 2010/0325273 A1 | 12/2010 | Kudo | |
| 2012/0192181 A1* | 7/2012 | Gilbert et al. | 718/1 |
| 2013/0054813 A1 | 2/2013 | Bercovici et al. | |
| 2013/0191845 A1* | 7/2013 | Koumori | 718/105 |
| 2013/0247052 A1* | 9/2013 | Ali | G06F 8/30 718/102 |
| 2013/0263135 A1* | 10/2013 | Chetlur | G06F 11/3442 718/100 |
| 2014/0173623 A1* | 6/2014 | Chang et al. | 718/105 |

OTHER PUBLICATIONS

Zhou, "A Trace-Driven Simulation Study of Dynamic Load Balancing", Sep. 1988, IEEE, vol. 14, No. 9.*

Shoens et al. "Synthetic Workload Performance Analysis of Incremental Updates", 1994, Springer-Verlag New York, pp. 329-338.*

Akoush et al., "Predicting the performance of virtual machine migration", IEEE International Symposium on Modeling, Analysis & Simulation of Computer and Telecommunication Systems (MASCOTS), Aug. 2010, pp. 37-46.

Jiang et al., "Performance Influence of Live Migration on Multi-Tier Workloads in Virtualization Environments", Cloud Computing 2012 : The Third International Conference on Cloud Computing, GRIDs, and Virtualization,Jul. 2012.

* cited by examiner

SAFE CONSOLIDATION AND MIGRATION

TECHNICAL FIELD

The present disclosure relates to consolidating workloads on host devices in general, and consolidating virtual machines, in particular.

BACKGROUND

Consolidating workloads relates to allocating computing resources to multiple programs, for example assigning multiple programs to computing devices for execution, while attempting to consolidate the programs to be executed by only a part of the available devices. Such consolidation may enable, for example, the other devices to assume idle mode and reduce expenses by saving power or other resources.

One specific example of workload consolidation relates to executing virtual machines and attempting to reduce the number of used servers by consolidating the virtual machines.

A virtual machine (VM) is a software implementation of a machine (i.e., a computer) that executes programs, similarly to a physical machine. There are two common types of virtual machines: 1. A system virtual machine which provides a complete system platform that supports execution of a complete operating system. A system virtual machine usually emulates an existing architecture, and may be used to provide a platform for executing programs where the real hardware is not available, for example, an obsolete or a very expensive platform. Another common use of system virtual machine relates to emulating multiple instances of identical machines, thus leading to more uniformity and efficient use of computing resources. 2. A process virtual machine, sometime referred to as language virtual machine, designed to support a single process and execute a single program. Process virtual machines are usually closely suited to one or more programming languages and built for providing program portability and flexibility.

An essential characteristic of a virtual machine of either type is that the software executed by the virtual machine is limited to the resources and abstractions provided by the virtual machine, and cannot exceed them even if the physical machine offers additional resources.

One purpose of consolidating virtual machines to physical machines is using fewer machines, thus saving power, maintenance and other resources. However, consolidation is to be performed such that each virtual machine existing on the target machine, as well as a virtual machine migrated to the physical machine will have sufficient resources such that it can execute as expected.

BRIEF SUMMARY

One exemplary embodiment of the disclosed matter is a computer-implemented method performed by a computerized device, comprising: receiving a target host and an application to be migrated to a target host; estimating a target load of the application to be migrated; generating a synthetic application which simulates a simulated load, the simulated load being smaller than the target load; loading the synthetic application to the target host; monitoring behavior of the target host, the synthetic application, or a second application executed thereon; subject to the behavior being satisfactory: if the simulated load is smaller than the target load, then repeating said generating, said loading and said monitoring, wherein said loading is repeated with increased load; and otherwise migrating the application to the target.

Another exemplary embodiment of the disclosed subject matter is a computerized apparatus having a processor, the processor being adapted to perform the steps of: receiving a target host and an application to be migrated to a target host; estimating a target load of the application to be migrated; generating a synthetic application which simulates a simulated load, the simulated load being smaller than the target load; loading the synthetic application to the target host; monitoring behavior of the target host, the synthetic application, or a second application executed thereon; subject to the behavior being satisfactory: if the simulated load is smaller than the target load, then repeating said generating, said loading and said monitoring, wherein said loading is repeated with increased load; and otherwise migrating the application to the target.

Yet another exemplary embodiment of the disclosed subject matter is a computer program product comprising a computer readable storage medium retaining program instructions, which program instructions when read by a processor, cause the processor to perform a method comprising: receiving a target host and an application to be migrated to a target host; estimating a target load of the application to be migrated; generating a synthetic application which simulates a simulated load, the simulated load being smaller than the target load; loading the synthetic application to the target host; monitoring behavior of the target host, the synthetic application, or a second application executed thereon; subject to the behavior being satisfactory: if the simulated load is smaller than the target load, then repeating said generating, said loading and said monitoring, wherein said loading is repeated with increased load; and otherwise migrating the application to the target.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
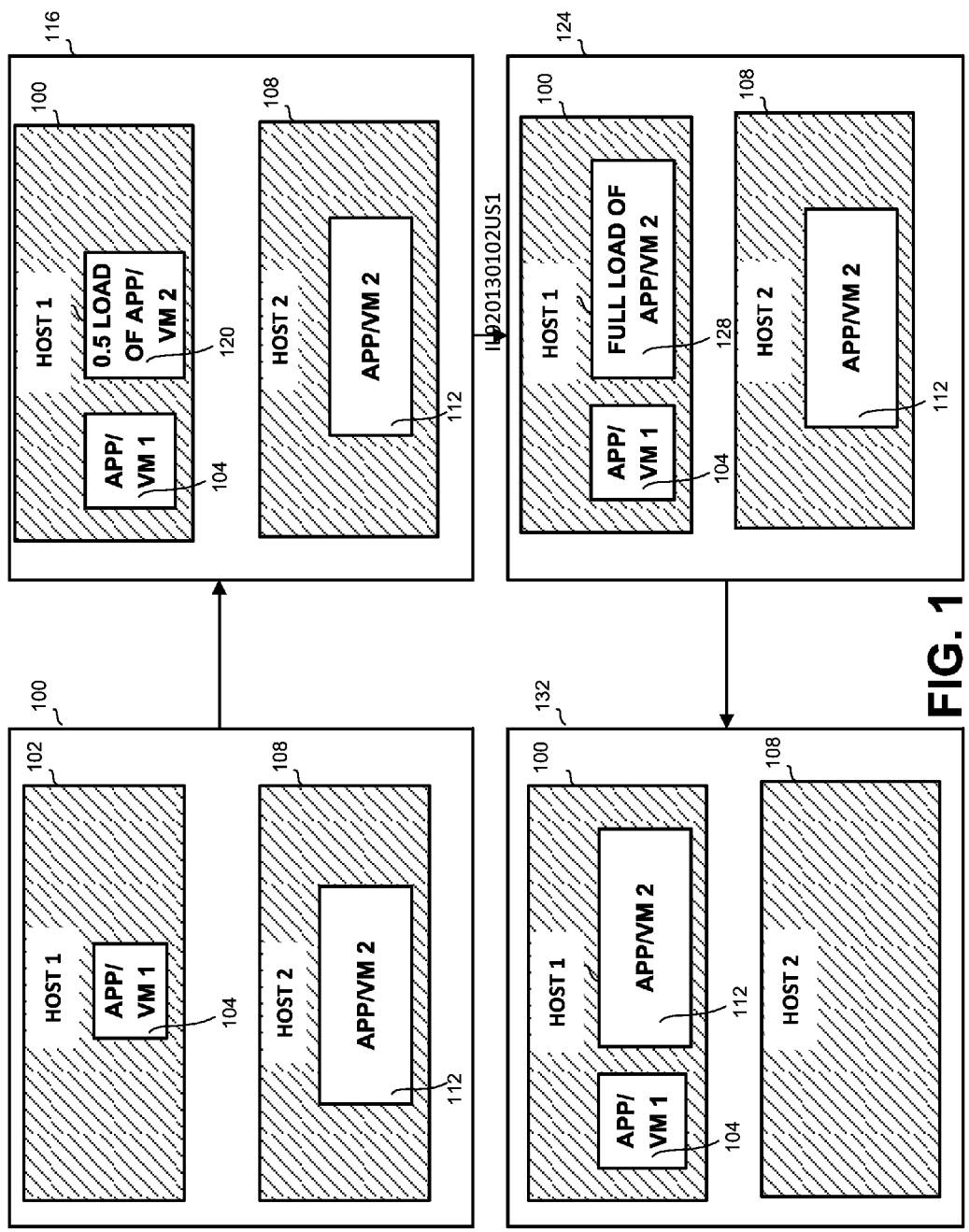
FIG. 1 shows a schematic illustration of migrating a virtual machine from a source host to a target host, in accordance with some exemplary embodiments of the subject matter.

One technical problem dealt with by the disclosed subject matter is the need to consolidate workloads for better utilizing operational and computer resources. However, consolidation should not impact the performance of applications executed by the target host prior to assigning additional programs to be executed by the same device, while ensuring sufficient resources for the newly migrated program. The term host, target host, or target device (collectively referred to as target or target host) may refer to any computerized device executing applications or virtual machines to which it is required to migrate the application or VM. The term source, source host, or source device (collectively referred to as source or source host) may also refer to any computerized device executing applications or virtual machines form which it is required to migrate the application or VM.

One possible strategy is to move an application from a source to a target without any checking. However, this strategy may result in discovering the target is under resource overload, such that one or more of the programs is not executed as expected. In order to avoid this situation, prior to moving an application to a different host, it is required to verify that the resources which the application may use will not disrupt the work of the applications already executed by that target host. Additionally or alternatively, it may be required to know whether the host has sufficient resources for the migrated application to execute as expected.

The issue of ensuring sufficient resources is particularly critical when having to migrate or move an application to a new node in a virtual system. Migrating an application, and in particular a virtual machine (VM) executing one or more applications is a heavy operation that should be performed when the conditions are adequate.

Some solutions are model-based as described for example in "Performance Modeling of Virtual Machine Live Migration", by Yangyang Wu Ming Zhao, incorporated herein by reference in its entirety and for all purposes. Other solutions take a trial-and-error approach in which migration is performed, and if throughput decreases the migration is reverted and possibly tried again later. Yet another approach uses wide safety margins when migrating an application to a host, thereby reducing the cost effectiveness of consolidations.

None of these solutions provides satisfactory performance and utilization of the hosts. This is partly due to some of the resources, such as shared memory, or I/O granularity, not being fully additive and thus not readily available for taking decisions.

One technical solution is to use a load generator that can generate a synthetic application emulating the load of the application or VM it is desired to migrate (collectively referred to as application or application to be migrated) to a target host computer, execute the synthetic application by the target and make sure the target can handle the load. In order to avoid impacting the applications that are already executed by the target, the load generator may start with emulating a lower load, and gradually increase the load until a workload representative of the application/VM is reached, or until the synthetic application or any of the existing applications is affected by the load. Alternatively, by observing, for example, the behavior or the idle time of the synthetic load, it may be determined that any of the other applications is about to be affected before this actually happens, such that it may be further determined that migrating the full load is impossible. Once the full load of the application or VM to be migrated is reached, and no application or VM is affected, the application or VM can be migrated to the host.

In some embodiments, emulating the load of an application or VM may be done, using the High Level Application Model (HLAM) benchmark, and in particular in in its incremental/ballooning mode, as described in U.S. patent application Ser. No. 13/950,314, entitled "PREDICTION OF IMPACT OF WORKLOAD MIGRATION" filed on Jul. 25, 2013, incorporated herein by reference in its entirety and for all purposes.

One technical effect of utilizing the disclosed subject matter is the safe migration of an application or a VM from a source host to a target host only after it is verified that such migration can take place without harming applications already executed by the target device, and while ensuring sufficient resources for the migrated application. Once safe migration is verified, the risks associated with workload consolidation are significantly removed, thus promoting consolidation and receiving the associated benefits, such as saving power, reducing maintenance costs and other resources and reducing total cost of ownership (TCO).

Referring now to FIG. 1 showing a schematic illustration of application or virtual machine migration, in accordance with some exemplary embodiments of the subject matter.

In the illustrative example of FIG. 1, checking the impact of the load of the application or VM to be migrated on the target device is performed in two stages. It will be however appreciated that this checking may be done in any number of steps, such as every 10%, every 1%, or the like, or in non-uniform intervals, as detailed below.

The top left part of FIG. 1, indicated 100, shows a situation prior to migration: host 1 (102) executing application or VM 1 (104) and host 2 (108) executing application or VM 2 (112).

At a second stage 116, half the load of application or VM 2 (120) is synthesized and loaded to host 1 (102). If the synthetic load migration succeeds such that both application or VM 1 (104) and synthetic load 120 receive enough resources, then at a third stage 124 the full load of application or VM 2 (128) is synthesized and loaded to host 1 (102).

If this second synthetic load migration succeeds such that both application or VM 1 (104) and synthetic load 128 receive enough resources, then at a fourth stage 132 application or VM 2 (112) is moved from host 2 (108) to host 1 (102). Host 2 (108) can then be put in idle state, receive another application migrated into it, or the like.

It will be appreciated that the empty (diagonally striped) areas of the hosts external to the shapes symbolizing the applications indicate unused resources of the respective host. Although resource usage is not always additive, it is generally true that adding applications to a host reduces the available resources.

It will be appreciated that each host may execute a multiplicity of applications and/or virtual machines. Migration of applications or virtual machines can be performed one by one. In other embodiments, particularly if the applications on host 2 (108) do not require significant resources, the checking and migration can be performed for a multiplicity of applications as one unit.

Figure 2:
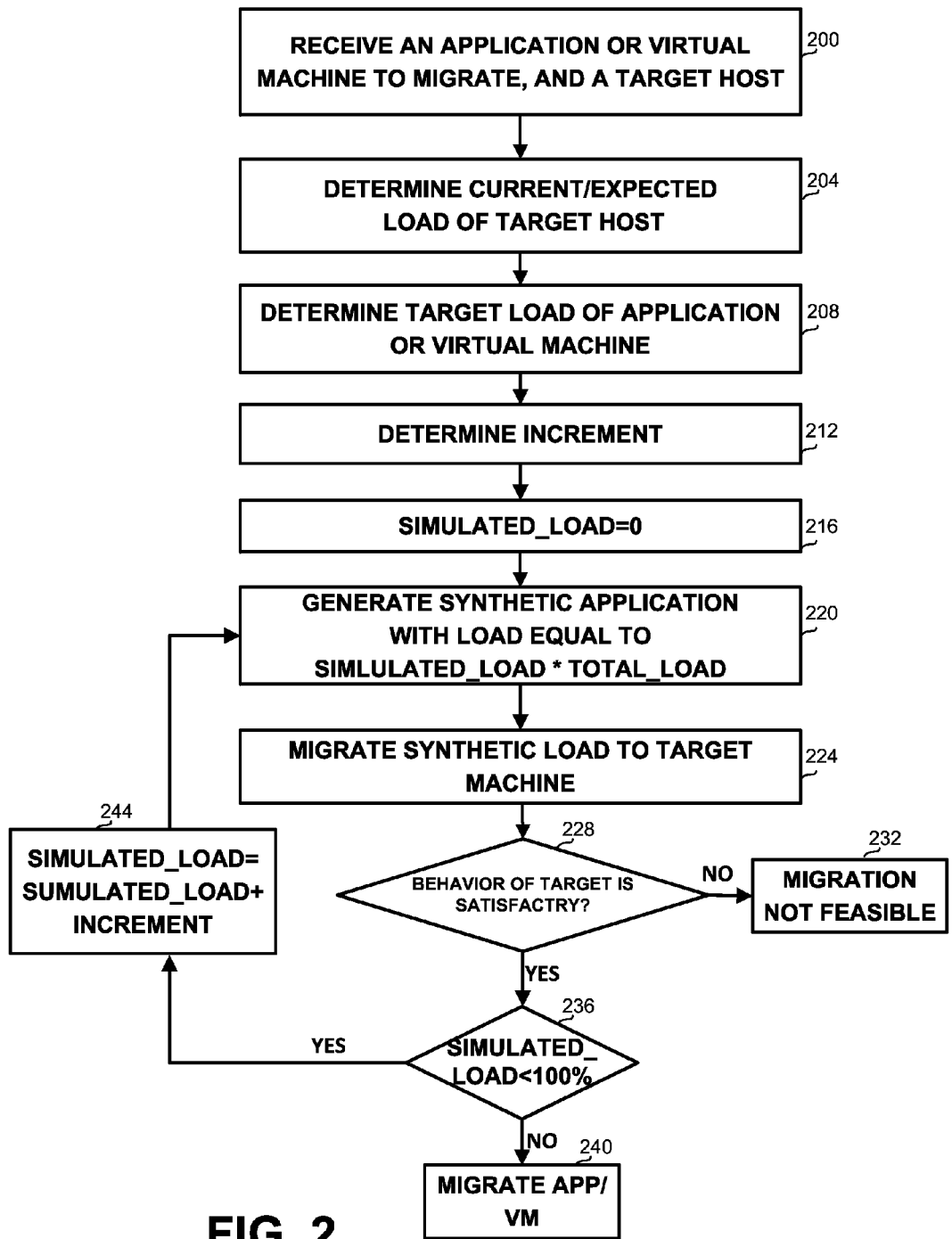
FIG. 2 shows a flowchart diagram of a method for migrating a virtual machine from a source host to a target host, in accordance with some exemplary embodiments of the subject matter.

Referring now to FIG. 2 showing a flowchart diagram of a method for migrating applications or VM, in accordance with some exemplary embodiments of the disclosed subject matter.

On step 200, an application or VM (collectively referred to as application) which is executed on a source host may be received. Also received is a target host to which it is required or suggested to migrate the application. The target host and the applications may be received as pointers, addresses, unique identifiers, or the like On optional step 204 a current load of the target host may be received or estimated. In some exemplary embodiments, it may be assessed that the load of the target is significantly less than its normal load or then the load expected when the application is migrated. As detailed below, in such cases the difference between the current load and the expected load will also be synthesized and loaded.

On step 208, the target load of the application to be migrated may be estimated. The target load may be a current load, the average load, a maximal load or any other measure.

On step 212 the increment at which it is required to check whether the target host can stand the additional load is determined or received. The increment can be predetermined or may depend on the load of the target host, the load of the application, or the like. The increment may also be non-uniform, for example start at 50%, then increment in steps of 10% until it reaches 20%, and then switch to 5% or 1% steps. In alternative embodiments, the increment may be determined based on any generally non-decreasing function.

On step 216 a variable named for example simulated_load may be set to zero. Alternatively as described below it may be set to a different initial value.

On step 220 a synthetic application or load having the load effect of simulated_load times the application load may be generated, and on step 224 the synthetic application or load are executed by the target host. It will be appreciated that the load of the synthetic application may not be exactly equal to the simulated_load times the application load, but may be rounded or otherwise similar.

On step 228 it may be determined whether the behavior of the target executing the pre-existing applications and the synthetic application is satisfactory, e.g., whether all applications on the target host, including the pre-existing applications as well as the synthetic load receive sufficient resources or their performance is as expected. This may be estimated using any one or more of several methods as detailed below.

If one or more of the applications does not receive sufficient resources or its performance is otherwise degraded, then it may be determined on step 232 that migration is infeasible, then migration may be rejected and the process may stop.

In one embodiment, whether the target host can function with the additional load may be determined by checking the performance of the other applications or VMs executed by the target host. If the performance degrades at all, or degrades beyond a certain threshold, migration may be infeasible. The performance may be estimated based on execution speed, resource consumption, response time, data throughput, or any quality of service parameter of the application or VM.

In another embodiment, the percentage of the time at which the target host is in idle state, or the ratio between this percentage and the percentage prior to executing the synthetic load, may be determined. As long as the target host has significant idle times, or that its idle time has not changed significantly, it may be assessed that the target can handle the additional load.

In yet another embodiment, monitoring tools that assess the utilization of the resources of the target host. This is different from the second option above, since such monitoring tools may consider the resource usage, for example disk usage, I/O usage, or the like, while the second option above checks the idle time of the host.

In a further embodiment, and as detailed for example in U.S. patent application Ser. No. 13/950,314, the synthetic load may keep track of its effective idle time. If the effective idle time is determined to be negative, for example when little or no actual idle time is measured, and the throughput is lower than the expected throughput, then negative effective idle time and system overload may be determined. If the actual idle time or the effective idle time of the synthetic load decreases below a predetermined threshold an alert may go off before any such existing application or VM is damaged, stopped, its quality of service is degraded, or its performance is otherwise hurt.

If it is determined on step 229 that all applications on the target host do receive enough resources, then on step 236 it is determined whether simulated_load is smaller than 100%. If it is, the simulated_load may be incremented in the increment determined on step 212 and execution returns to step 220.

If simulated_load is equal to (or exceeds) 100%, then on step 240 the application may be migrated to the target host.

Figure 3:
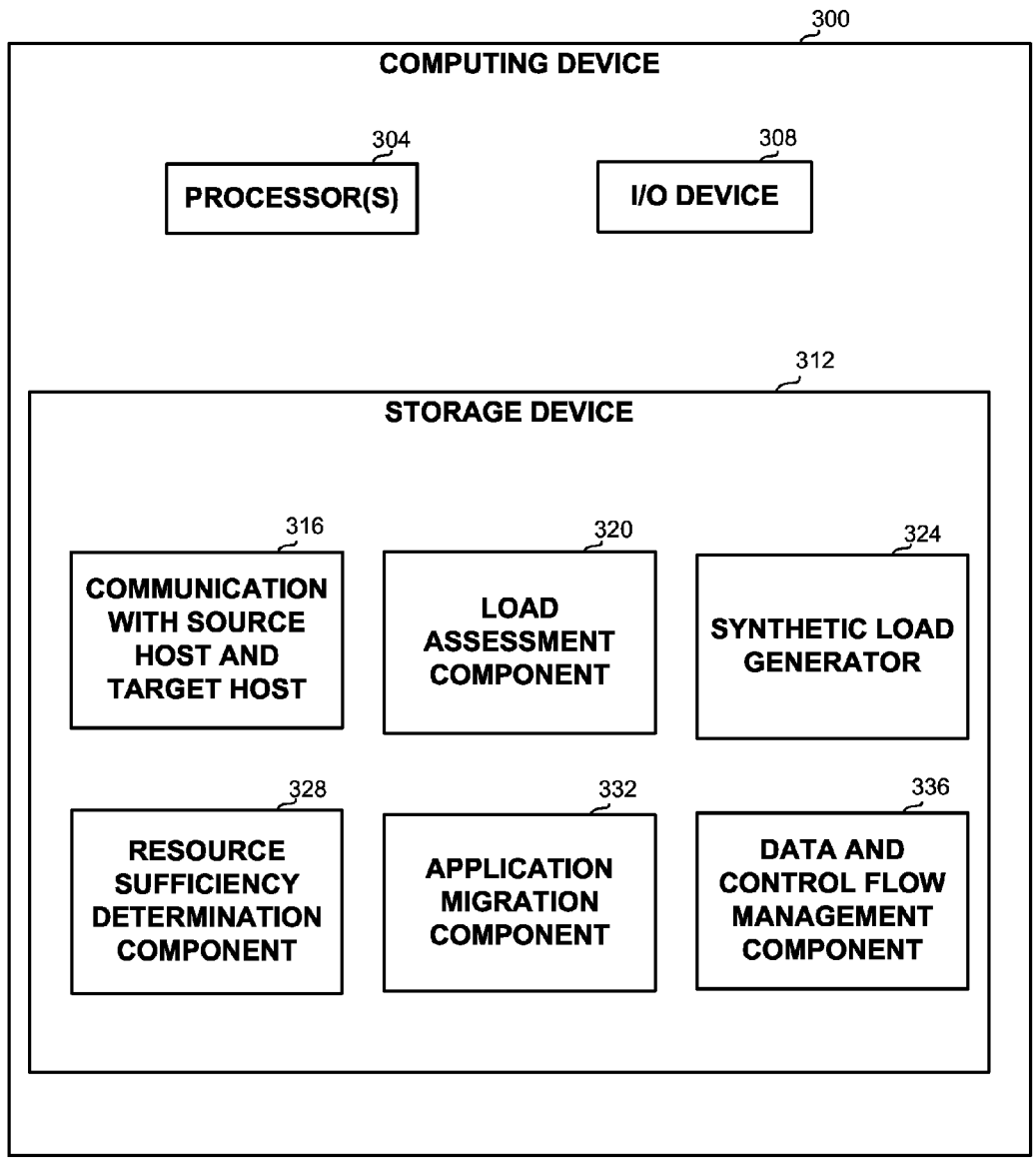
FIG. 3 shows a block diagram of an apparatus for migrating a virtual machine from a source host to a target host, in accordance with some exemplary embodiments of the disclosed subject matter.

Referring now to FIG. 3 showing an apparatus 300 configured to migrate applications to a host, in accordance with some exemplary embodiments of the disclosed subject matter.

In some exemplary embodiments, apparatus 300 may comprise a processor 304. Processor 304 may be a Central Processing Unit (CPU), a microprocessor, an electronic circuit, an Integrated Circuit (IC) or the like. Processor 304 may be utilized to perform computations required by the apparatus 300 or any of it subcomponents.

It will be appreciated that apparatus 300 may be implemented as the same computing device as the source host from which it is required to migrate an application, as the target host to which it is required to migrate the application, or another computing platform.

In some exemplary embodiments of the disclosed subject matter, apparatus 300 may comprise an Input/Output (I/O) device or module 308. I/O device or module 308 may be a keyboard, a mouse, a touch screen, voice activated device or the like. I/O device or module 308 may be utilized to provide an output to and receive input from a user.

In some exemplary embodiments, computing platform 300 may comprise one or more storage devices such as storage device 312. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause processor 304 to perform acts associated with the disclosure.

The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may comprise a communication with source host and target host component 316, which provides for communicating with a source host from which it is required to migrate an application, and with a target host to which the migration is to be done. As mentioned above, the apparatus may be implemented on the source host, the target host or a third device, such that communication may be required accordingly. Communication with source host and target host component 316 may provide for migrating applications, receiving information, setting parameters which may relate to the available or used resources of a host or application, the performance of applications executed by the source host, the application to be migrated and possibly other entities.

Storage device 312 may also comprise a load assessment component 320 for assessing the load of an application to be migrated. The load may refer to a current load, an average load, a peak load, or any other measure.

Storage device 312 may comprise a synthetic load generator 324 for generating a synthetic application causing a load substantially equal to a given load, which may be expressed as a set of factors, such as CPU consumption, disk access, communication resources or the like. Load generator 324 may be used for generating synthetic applications having increasing loads up to the load of the application to be migrated. Load generator 324 may also be used for making the target host execute the synthetic application so that performance may be assessed.

Storage device 312 may comprise a resource sufficiency determination component 328 for determining whether the target host is able to execute all pre-existing applications, as well as the synthetic application imitating the load of the application to be migrated. Resource sufficiency can be determined as detailed above, by: evaluating the performance of the pre-existing applications executed by the target host; the percentage of the time at which the target host is in idle state or the ratio between this percentage and the percentage prior to executing the synthetic load; by monitoring tools that assess the utilization of the target host, or any combination thereof.

Storage device 312 may also comprise application migration component 332 for migrating the application from the source host to the target host once it is determined that the target host can execute it in addition to all pre-existing applications.

Storage device 312 may also comprise data and control flow management component 336 for managing the flow of information and control between other components, for example receiving the load of the application to be migrated, activating synthetic load generator 324 for generating synthetic applications having increasing loads and making the target host execute them, and finally having migration component 332 migrate the application to the target host and stopping or removing it from the source host.

In some embodiments, information about the expected or average or peak load of the target host may be available. If such information is available, and if the load is higher or higher in at least a predetermined threshold than the current load experienced by the target host, then although the target host may stand the synthetic load for the full consumption of the application to be migrated, it may still not be able to provide the resources at a later time, which may be after the actual application is migrated. In order to overcome this problem, the synthetic load generator may be adapted to create applications having load equal to the required percentage of the application to be migrated, plus the difference between the current load and the expected load of the current device. In other embodiments, a first synthetic application may be generated having a load equal to the difference between the current load and the expected load, and only after this synthetic application is executed by the target host, testing the migration of the application is performed as detailed above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method performed by a computerized device, comprising:
   receiving a target host and an application to be migrated to a target host;
   receiving a current load of the target host;
   estimating a target load of the application to be migrated;
   generating a first synthetic application which simulates a simulated load, the simulated load being smaller than the target load;
   estimating an expected load of the target host;
   subject to the expected load being smaller than a current load, generating a second synthetic application that generates load equal to the difference between the expected load and the current load;
   executing the second synthetic application by the target host;
   loading the first synthetic application to the target host;
   monitoring behavior of the target host, the first synthetic application, or a second application executed thereon;
   subject to the behavior being satisfactory:
      if the simulated load is smaller than the target load, then repeating said generating, said loading and said monitoring, wherein said loading is repeated with increased load; and
      otherwise migrating the application to the target.

2. The computer-implemented method of claim 1, wherein said monitoring comprises determining whether applications executed by the host prior to the first and second synthetic applications receive sufficient resources or their performance is not degraded.

3. The computer-implemented method of claim 1, wherein said monitoring comprises determining a percentage of the time at which the target host is in idle state, or a percentage of the time at which the target host is in idle state relatively to a previous percentage.

4. The computer-implemented method of claim 1, wherein said monitoring comprises monitoring utilization of resources used by the target host in executing the first synthetic application and the second application.

5. The computer-implemented method of claim 1, wherein said monitoring comprises determining whether the actual idle time or the effective idle time of the first synthetic application is below a predetermined measure.

6. The computer-implemented method of claim 1, wherein the application is a virtual machine.

7. The computer-implemented method of claim 1, wherein the increased load is determined in accordance with a function.

8. The computer-implemented method of claim 1, further comprising rejecting migration subject to the behavior being non-satisfactory.

9. A computerized apparatus having a processor, the processor being adapted to perform the steps of:
   receiving a target host and an application to be migrated to a target host;
   receiving a current load of the target host;
   estimating a target load of the application to be migrated;
   generating a first synthetic application which simulates a simulated load, the simulated load being smaller than the target load;
   estimating an expected load of the target host;
   subject to the expected load being smaller than a current load, generating a second synthetic application that generates load equal to the difference between the expected load and the current load;
   executing the second synthetic application by the target host;
   loading the first synthetic application to the target host;
   monitoring behavior of the target host, the first synthetic application, or a second application executed thereon;
   subject to the behavior being satisfactory:
      if the simulated load is smaller than the target load, then repeating said generating, said loading and said monitoring, wherein said loading is repeated with increased load; and
      otherwise migrating the application to the target.

10. The apparatus of claim 9, wherein said monitoring comprises determining whether applications executed by the host prior to the first and second synthetic applications receive sufficient resources or their performance is not degraded.

11. The apparatus of claim 9, wherein said monitoring comprises determining a percentage of the time at which the target host is in idle state, or a percentage of the time at which the target host is in idle state relatively to a previous percentage.

12. The apparatus of claim 9, wherein said monitoring comprises monitoring utilization of resources used by the target host in executing the first synthetic application and the second application.

13. The apparatus of claim 9, wherein said monitoring comprises determining whether the actual idle time or the effective idle time of the first synthetic application is below a predetermined measure.

14. The apparatus of claim 9, wherein the application is a virtual machine.

15. The apparatus of claim 9, wherein the increased load is determined in accordance with a function.

16. The apparatus of claim 9, wherein the processor is further adapted to reject migration subject to the behavior being non-satisfactory.

17. A computer program product comprising a computer readable storage medium retaining program instructions, which program instructions when read by a processor, cause the processor to perform a method comprising:
  receiving a target host and an application to be migrated to a target host;
  receiving a current load of the target host;
  estimating a target load of the application to be migrated;
  generating a first synthetic application which simulates a simulated load, the simulated load being smaller than the target load;
  estimating an expected load of the target host;
  subject to the expected load being smaller than a current load, generating a second synthetic application that generates load equal to the difference between the expected load and the current load;
  executing the second synthetic application by the target host;
  loading the first synthetic application to the target host;
  monitoring behavior of the target host, the first synthetic application, or a second application executed thereon;
  subject to the behavior being satisfactory:
    if the simulated load is smaller than the target load, then repeating said generating, said loading and said monitoring, wherein said loading is repeated with increased load; and
  otherwise migrating the application to the target.

* * * * *